Patented Nov. 4, 1930

1,780,297

UNITED STATES PATENT OFFICE

WARREN F. HEINEMAN, OF SHOREWOOD, WISCONSIN, ASSIGNOR TO A. O. SMITH CORPORATION, OF MILWAUKEE, WISCONSIN, A CORPORATION OF NEW YORK

PROCESS OF ELECTRIC FLASH WELDING

No Drawing. Application filed March 26, 1930. Serial No. 439,262.

This invention relates to a process of electric flash welding and has particular relation to the welding of long seams such as the longitudinal seams of pipe sections constructed for the transportation of oil and gas in underground pipe lines.

The object of the invention is to provide a process of welding as above referred to wherein the heating of the edges is more uniform and is subject to more ready and accurate control.

The invention has found a specific application in the welding of comparatively thick walled pipe of large diameter where the weld is required to be as sound as the pipe stock and capable of withstanding internal fluid pressures approximating from 500 to 1000 lbs. per square inch.

In carrying out the invention the longitudinal edges of the pipe section to be welded are first brought into arcing relation by applying welding current transversely thereto, while the edges are spaced apart, and slowly moving the edges relatively toward each other. Any unevenness in the edges or inaccurate parallel alignment thereof will be corrected by this preliminary flashing operation as the projecting or early contacting portions of the edges are flashed away until a uniform flashing arc is established for the full common length of the edges.

The next step in the welding operation is for the purpose of obtaining a distribution of heat at the edges and consists in abutting the edges under light pressure while maintaining the application of welding current thereacross similar to resistance welding processes. The heat produced in this step is chiefly due to the resistance of the metal to the flow of current, and consequently the walls of the pipe adjacent the edges and between the electrodes which apply the current thereto become substantially heated for a distance back from the edges. The transverse dimensions of this heated region will depend upon the distance of separation of the electrodes and should be varied according to requirements as to the thickness of the parts being welded and the amount of upsetting required in the final step of the welding operation. The metal is preferably heated to a red heat or plastic state during this step.

The third step is that of flashing and consists in separating the heated edges while maintaining the application of welding current thereto, and thereby establishing a flashing arc between the edges for their full common length. In this step the metal at the edges is raised to fusion welding temperatures by the flashing arc preparatory to the final welding operation. During this step the metal of the edges is consumed or flashed away progressively by the arc and the edges are fed toward each other at a rate to maintain the flashing arc for the required time.

The final step is that of rapidly abutting the heated edges under heavy pressure and at substantially the same time, or shortly thereafter, opening the welding circuit. This is the actual welding step wherein the metal of the edges becomes fused together and a substantial portion of metal along with possible impurities is upset out of the line of the weld.

The welding process, as above set forth, has certain advantages over the ordinary resistance welding methods in that a more uniform heating of the edges and more perfect weld is obtained, and over the ordinary flash welding methods in that a more uniform fusion and upsetting of the metal of the edges is obtained. The resistance heating of the edges provides a deeper penetration of heat which prevents too rapid cooling of the heated edges at the time of the final upsetting operation.

I claim:

1. The process of electric flash welding comprising first flashing uneven edge portions away to obtain an accurate parallelism of the edges to be welded, then abutting the edges under light pressure while maintaining the application of welding current thereacross to obtain a distribution of heat in the metal adjacent the edges, then establishing a flashing arc between the edges to heat the metal thereof to welding temperature, and finally abutting the edges under heavy pressure and discontinuing the application of the welding current to obtain a fusing and welding of the metal of the edges and to give the required upset to the weld.

2. The process of electric flash welding comprising applying welding current transversely of the edges to be welded while moving said edges relatively toward each other to flash away uneven edge portions and obtain an accurate parallelism of the edges, abutting the edges under light pressure while maintaining the flow of welding current thereacross, separating the edges and establishing a flashing arc therebetween to heat the edges to welding temperature, and finally abutting the edges under heavy pressure and discontinuing the application of welding current thereto to obtain a fusing and welding of the metal of the edges and to give the required upset to the weld.

3. The process of electric flash welding longitudinal seams of substantial length in tubular articles such as oil and gas line pipe, comprising applying welding current transversely of the longitudinal edges of the blank to be welded while moving said edges relatively toward each other to flash away uneven projecting edge portions and obtain an accurate parallelism of the edges, when the arc has become uniform for the full length of the edges abutting the edges under light pressure while maintaining a flow of welding current thereacross to heat the metal adjacent said edges, separating the heated edges and establishing a flashing arc therebetween to heat the metal of the edges to welding temperature, and finally abutting the edges under heavy pressure and substantially simultaneously therewith discontinuing the application of welding current.

In testimony whereof I have signed my name at Milwaukee, Wisconsin, this 22nd day of March, 1930.

WARREN F. HEINEMAN.